(12) United States Patent
Hatcher

(10) Patent No.: US 12,066,146 B2
(45) Date of Patent: Aug. 20, 2024

(54) SUITCASE INTEGRATED LAPTOP TRAY

(71) Applicant: Robert Hatcher, Philadelphia, PA (US)

(72) Inventor: Robert Hatcher, Philadelphia, PA (US)

( * ) Notice: Subject to any disclaimer, the term of this patent is extended or adjusted under 35 U.S.C. 154(b) by 203 days.

(21) Appl. No.: 17/724,918

(22) Filed: Apr. 20, 2022

(65) Prior Publication Data

US 2023/0341082 A1 Oct. 26, 2023

(51) Int. Cl.
*F16M 13/02* (2006.01)
*A45C 9/00* (2006.01)
*A47B 23/04* (2006.01)

(52) U.S. Cl.
CPC .............. *F16M 13/02* (2013.01); *A45C 9/00* (2013.01); *A47B 23/043* (2013.01)

(58) Field of Classification Search
CPC .......... F16M 13/02; A45C 9/00; A47B 23/043
USPC ........................................................ 361/115
See application file for complete search history.

(56) References Cited

U.S. PATENT DOCUMENTS

| | | | | |
|---|---|---|---|---|
| 6,105,508 A * | 8/2000 | Ryburg | .................. | A47B 23/02 |
| | | | | 108/42 |
| 6,736,073 B2 * | 5/2004 | Ryburg | .................. | A47B 23/04 |
| | | | | 108/42 |
| 9,498,055 B2 * | 11/2016 | Distefano | ............ | A47B 13/088 |
| 9,918,546 B2 * | 3/2018 | Smith | ...................... | A45C 5/06 |
| 10,285,495 B1 * | 5/2019 | Valme | .................. | A47B 13/081 |
| 10,561,234 B1 * | 2/2020 | von Goins | ............. | A47B 23/06 |
| 11,140,958 B1 * | 10/2021 | Baldwin | ................ | A45C 13/28 |
| 2007/0145700 A1 * | 6/2007 | Ambrose | .................. | A47C 9/10 |
| | | | | 280/47.26 |
| 2008/0134946 A1 * | 6/2008 | Alonso | .................... | A45C 9/00 |
| | | | | 108/50.11 |
| 2013/0032443 A1 * | 2/2013 | Soedomo | ................. | A45C 9/00 |
| | | | | 190/11 |
| 2016/0113388 A1 * | 4/2016 | Distefano | ................ | A45C 5/14 |
| | | | | 108/41 |

* cited by examiner

*Primary Examiner* — Timothy J Thompson
*Assistant Examiner* — Michael F McAllister
(74) *Attorney, Agent, or Firm* — Lyman Moulton, Esq.; Moulton Patents, PLLC

(57) ABSTRACT

The laptop tray is the only product of its kind that enables users to easily release and retract a foundational item from their suitcase that can be used to hold a wide variety of items. This unprecedented product is uniquely designed with a charging port, a small ledge that prevents a laptop from sliding off, and ultimately, provides an accessory that can be adjusted to accommodate a user's preferences.

16 Claims, 2 Drawing Sheets

SUITCASE INTEGRATED LAPTOP TRAY

BACKGROUND

While waiting at the airport, finding a comfortable place to set a laptop up for utilization and/or to just have a space to enjoy a meal, can be very difficult. Furthermore, given the severity of the current COVID-19 pandemic, many individuals are rightfully concerned about placing their belongings on public surfaces that may be contaminated. There have been no products available as original equipment or as an aftermarket to address this problem.

An apparatus to provide a place to utilize your laptop while traveling without worrying about public surfaces, is not being met by any known device or system at present. There have been no products available as original equipment or as an aftermarket to address this problem either.

SUMMARY OF THE INVENTION

The main purpose of the suitcase integrated laptop tray is to provide users with a compact pull-out laptop tray specifically designed for suitcases.

A suitcase pocket accessory for a suitcase and includes a height member comprising a bottom bar and a top bar and a height from a bottom of the bottom bar to a top of the top bar and a connection between a top of the bottom bar and a bottom of the top bar. The disclosure also includes an extension sleeve configured to form the connection for each of the pair of height members by a sliding of the top of the bottom bar parallel to and across the bottom of the top bar. The disclosure additionally includes a tray configured to be received into a pocket of the suitcase and to comprise a back edge, a front edge, two side edges, a top surface and an opposing bottom surface. The disclosure further includes a hinge configured to attach to the top of the top bar and to swing the tray into a use position relative to the height member and into a storage position parallel to the height member.

Figure 1:
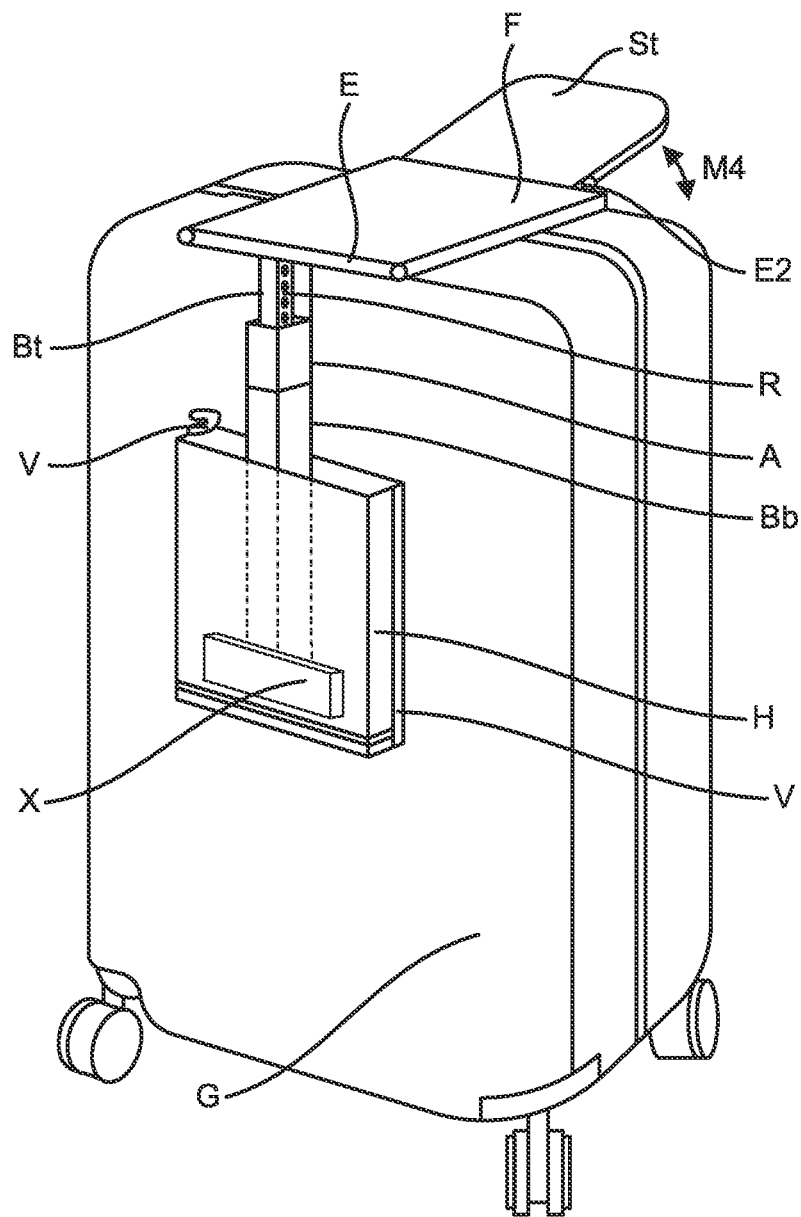
FIG. 1 is front perspective view of the suitcase integrated laptop tray with a single height member in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is front perspective view of the suitcase integrated laptop tray with a single height member showing: sliding sleeve referenced as A, adjustable height members referenced as Bt for a top bar and Bb for a bottom bar comprising the height member, a charging port referenced as C, a hinge referenced as E, a laptop tray referenced as F, a suitcase referenced as G, a pocket referenced as H, a plurality of ratchet holes R, a hook and loop attachment V of the pocket G, a subtray St, a second hinge E2 from the subtray G and a cross member X received into the pocket G in accordance with an embodiment of the present disclosure. A movement M4 sets a relative angle between the subtray St and the top of the suitcase opposite the wheels of the suitcase.

Figure 2:
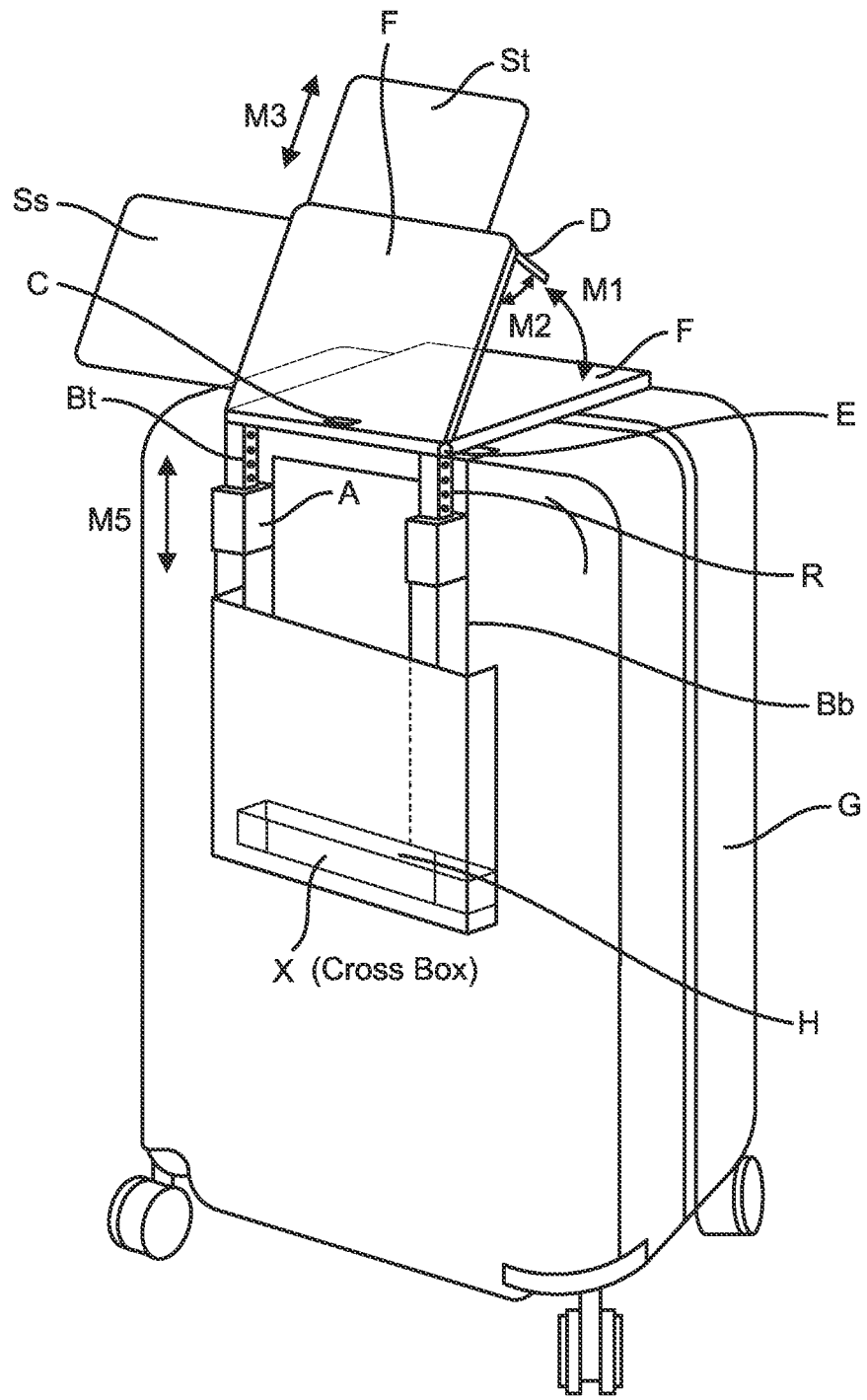
FIG. 2 is a front perspective of the suitcase integrated laptop tray with a double height member in accordance with an embodiment of the present disclosure.

FIG. 2 is front perspective view of the suitcase integrated laptop tray with a double height member showing: sliding sleeve referenced as A, adjustable height members referenced as respective Bt for a top bar and Bb for a bottom bar comprising the respective height member, a charging port referenced as C, a prop leg referenced as D, a hinge referenced as E, a laptop tray referenced as F, a suitcase referenced as G, a pocket referenced as H, a plurality of ratchet holes R, a hook and loop attachment V of the pocket G, a subtray St, a subtray Ss, a second hinge 112 from the subtray G and a cross member X received into the pocket G in accordance with an embodiment of the present disclosure. A movement M1 sets a relation between the tray F and a top of the suitcase, M2 sets a relation between the prop leg D and the tray E, M3 sets an extension relation of the subtray St to the tray St front edge and M5 sets a parallel extension of the top bar to the bottom bars respectively.

The present disclosed suitcase integrated laptop tray, also known as the "Laptop Tray" offers a modern device that enables users to conveniently pullout a tray right from their suitcases to provide a clean, secure, and accommodating platform for their electronics, books, meals, or any other items. Expanding on the initial design of an average suitcase, the laptop tray introduces a novel accessory that slides in and out of a pocket that is found on the back of the suitcase. Users can pull the tray up and out which will rotate it over slightly past the top of the handle, positioning the tray to rest on top of the suitcase at a slight angle. To further enhance functionality, a small pair of folding legs can also be released from the bottom of the tray which allows the tray to sit-up while one is eating. This one-of-a-kind product ensures a fully operational tray that can be easily extended and placed back into a suitcase to ensure individuals have access to a tray at all times, while at the airport or any other setting.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A suitcase pocket accessory for a suitcase and comprising:
    a height member comprising a bottom bar and a top bar and a height from a bottom of the bottom bar to a top of the top bar and a connection between a top of the bottom bar and a bottom of the top bar, wherein the height member further comprises a plurality of ratchet positions relative to the extension sleeve;
an extension sleeve configured to form the connection for each of the pair of height members by a sliding of the top of the bottom bar parallel to and across the bottom of the top bar;
a tray configured to be received into a pocket of the suitcase and to comprise a back edge, a front edge, two side edges, a top surface and an opposing bottom surface; and
a hinge configured to attach to the top of the top bar and to swing the tray into a use position relative to the height member and into a storage position parallel to the height member.

2. The suitcase accessory of claim 1, further comprising a cross member attached at the bottom of the bottom bar and configured with a length less than a length of the suitcase pocket.

3. The suitcase accessory of claim 1, further comprising a prop leg hingedly attached to the front edge of the tray.

4. The suitcase accessory of claim 1, further comprising an electrical charging port for a laptop and a phone on the tray.

5. The suitcase accessory of claim 1, further comprising a pair of height members each attached via the hinge to the back of the tray.

6. The suitcase accessory of claim 1, wherein the tray further comprises a subtray pullout disposed adjacent the tray.

7. The suitcase accessory of claim 1, further comprising a subtray pullout disposed adjacent the bottom surface.

8. The suitcase accessory of claim 1, wherein the use position disposes the top surface of the tray parallel to a top surface of the suitcase.

9. The suitcase accessory of claim 1, wherein the storage position is received into the suitcase pocket.

10. The suitcase accessory of claim 1, wherein the height member, the tray, the hinge and the extension sleeve are all portable from the suitcase pocket.

11. The suitcase accessory of claim 1, wherein the height member, the tray, the hinge and the extension sleeve are all received into the suitcase pocket.

12. The suitcase accessory of claim 1, wherein the suitcase pocket is prefabricated into the suitcase.

13. The suitcase accessory of claim 1, wherein the suitcase pocket is attached to the suitcase via a hook and a loop attachment.

14. The suitcase accessory of claim 1, wherein the suitcase pocket is attached to the suitcase on a back side of the suitcase proximal a top of the suitcase.

15. The suitcase accessory of claim 1, wherein the use position is 45 degrees relative to a top surface of the suitcase via the hinge.

16. The suitcase accessory of claim 1, further comprising a subtray configured to hingedly extend from the bottom surface of the tray at a fixed angle thereto.

* * * * *